US006928124B2

(12) United States Patent
Friedman

(10) Patent No.: US 6,928,124 B2
(45) Date of Patent: Aug. 9, 2005

(54) METHOD AND SYSTEM FOR FAST SYNCHRONIZATION MULTIFRAME STRUCTURES USING PERIODIC SIGNATURES

(75) Inventor: Royi Friedman, Ramat Gan (IL)

(73) Assignee: ECI Telecom Ltd., Petach Tikva (IL)

( * ) Notice: Subject to any disclaimer, the term of this patent is extended or adjusted under 35 U.S.C. 154(b) by 798 days.

(21) Appl. No.: 09/893,543

(22) Filed: Jun. 29, 2001

(65) Prior Publication Data

US 2002/0009165 A1 Jan. 24, 2002

(30) Foreign Application Priority Data

Jun. 29, 2000 (IL) ................................................ 137086

(51) Int. Cl.[7] ................................................ H03D 1/00
(52) U.S. Cl. ........................ 375/340; 375/346; 375/357; 370/514; 370/376; 370/517
(58) Field of Search ................................ 375/340, 346, 375/357; 370/514, 376, 517

(56) References Cited

U.S. PATENT DOCUMENTS

| | | | | |
|---|---|---|---|---|
| 5,734,687 A | * | 3/1998 | Kainulainen | 375/357 |
| 5,841,779 A | * | 11/1998 | Kainulainen | 370/514 |
| 6,654,368 B1 | * | 11/2003 | Smith et al. | 370/376 |
| 2002/0090009 A1 | * | 7/2002 | Yehuda et al. | |

OTHER PUBLICATIONS

International Telecommunication Union, General Aspects of Digital Transmission Systems; Terminal Equipments, Frame Alignment and Cyclic Redundancy Check (CRC) Procedures Relating to Basic Frame Structures Defined in Recommendation G.704, (1991).

International Telecommunication Union, General Aspects of Digital Transmission Systems; Synchronous Frame Structures USED at 1544, 6312, 2048, 8488 and 44 736 kbit/s Hierarchical Levels (1995).

* cited by examiner

Primary Examiner—Shuwang Liu
Assistant Examiner—Eva Zheng
(74) Attorney, Agent, or Firm—Browdy and Neimark, P.L.L.C.

(57) ABSTRACT

The invention describes a method and a system for fast and economic synchronization of multiframe structures, such as PDH multiframe binary signals, by detecting a periodic binary signature in a binary signal using one final state machine (FSM) comprising a logical scheme interconnected with a memory block having a plurality of independent memory cells with serial numbers for cyclically connecting thereof to the logical scheme; the signature is detected by applying the signal to the FSM while synchronously switching the cells to the FSM. The arrangement is such that when the predetermined periodic binary signature occurs in the signal, one of the cells will reach its predetermined terminal state.

12 Claims, 4 Drawing Sheets

METHOD AND SYSTEM FOR FAST SYNCHRONIZATION MULTIFRAME STRUCTURES USING PERIODIC SIGNATURES

FIELD OF THE INVENTION

The invention relates to detecting periodic binary signatures in binary signals, preferably for synchronization of binary data streams in the form of multiframes using binary signatures. More particularly, the invention concerns synchronization of multiframes in telecommunication systems based on PDH (Plesiochronous Digital Hierarchy).

BACKGROUND OF THE INVENTION

When handling transmission streams in PDH at 1544 kb/s, it is accepted to arrange them in multiframes. Multiframes are used, for example, to transmit a number of telepnone conversations via a common data channel, wherein each frame in the multiframe carries information relevant to a different telephone call. In PDH, there are two alternative basic multiframe structures: 24-frame structure and a 12-frame one, respectively comprising 24 or 12 standard PDH data frames. It is understood, that if information is transmitted in long data blocks such as multiframes structures, there is a need to define the beginning and the end of such a structure, in other words—a need to synchronize the data so as to calculate positions of any characteristic bytes and bits in the frames. Each of these standard multiframe streams comprises a so-called FAS portion (bits forming a Frame Alignment Signal) which constitutes a binary signature. The principle of using FAS in multiframes is explained in the Standard Recommendation G.706 (1991). In the 24-frame multiframe structure, one bit of those assigned to bear the FAS is placed in a particular position of every fourth frame, so that six such bits form in succession a FAS code "001011" (so-called periodic signature). This widely used arrangement was proposed in an ITU-T Standard Recommendation G.704 (7/95), namely, in table I/G.704 for the 24-frame multiframe structure.

The Standard Recommendation G.704 speaks about the Multiframe alignment signal (FAS) as follows: "The F-bit of every fourth frame forms the pattern 001011 . . . 001011. This multiframe alignment signal is used to identify where each particular frame is located within the multiframe in order to extract the cyclic redundancy check code, CRC-6, and the data link information, as well as to identify those frames that contain signaling (frames 6,12,18,24), if channel associated signaling is used." It means, that one F-bit belonging to FAS can be found in every four frames.

Position of the FAS code in the 12-frame PDH structure, and the signature itself differ from those in the 24-frame structure; they are defined in Table 10/G.704 of the same G.704 document. It should be noted, however, that the principle of inserting periodic signatures is similar also for other multiframe structures, such as those used in PDH systems.

If the proper place of a periodic signature in the multiframe is known, and if presence of the periodic signature is detected in a currently arriving data stream, various required operations and control functions related to the data stream can be synchronized with respect to the determined position of the signature. In prior art, the signature position (once determined in the current data stream) is usually re-checked for confirmation, by obtaining the same signature "n" times with the known periodicity.

However, the above-mentioned standards, as well as other standards known to the Applicant, do not explain how the periodic signatures can be revealed in the data stream. Existing techniques of doing that are quite cumbersome and require a high expenditure of hardware. For example, a great number of interacting final state machines (FSM) can be designed to catch a cyclic signature in a multiframe.

OBJECT OF THE INVENTION

It is therefore the object of the present invention to provide a method and a system allowing the detecting of signatures and the synchronizing of multiframes to be performed in a maximally fast and economic way.

SUMMARY OF THE INVENTION

The most important operation of the synchronizing process is detection of a predetermined periodical signature in a signal to be synchronized.

To achieve the above object, there is proposed a method for detecting a periodic binary signature in a binary signal, the method including the following steps:

providing the binary signal being a succession of binary symbols transmitted at a predetermined bit rate;

providing the periodic binary signature in the form of a pre-selected binary code having a code length of "C" binary symbols spread over the signal with a spacing of "D" bits both between the binary symbols of the code and between any two adjacent said periodic signatures;

providing a state machine comprising a logical scheme interconnected with a memory block, providing the memory block of said state machine to comprise "D" independent memory cells each having its serial number, for cyclically connecting thereof to the logical scheme (thereby ensuring that the memory block includes as many memory cells as required to catch one binary symbol of the signature).

ensuring that each of the memory cells, when in conjunction with the logical scheme, is capable of registering "K" successive binary states of the state machine including an initial state and a terminal state and comprising "C" successive binary states respectively associated with "C" binary symbols of the signature appearing in their predetermined order in said signature, (the C-th state being a check state indicating receipt of the complete signature in the predetermined order);

assigning one and the same said initial binary state (for example, "zero"="before receiving a first binary symbol of the expected code") to all the cells in the memory block;

applying said binary signal, at the predetermined bit rate, to the state machine, synchronously with said bit rate, switching the logical scheme of the state machine to said D memory cells according to their serial numbers and in a cyclical order for processing each bit within any group of D successive bits of the binary signal by a particular cell of the D memory cells; thereby associating each particular memory cell in the memory block with a respective bit in any group of D successive bits of the signal;

continuously checking whether at least one cell of said "D" memory cells has registered the terminal state, and if yes, selecting therefrom a single memory cell considered as detecting said signature, if no, continuing the operation of applying the binary signal to the state machine.

In the most preferred version of the method, it is intended for synchronizing the binary signal using the periodic binary signature "S", wherein said signal is a succession of equally sized multiframes, each of said multiframes comprises N binary frames having the frame length "F" bits, and wherein the periodic binary signature has a predetermined position in the multiframe.

Preferably, the checking operation is performed by continuously monitoring whether at least one cell of said "D" memory cells has registered the terminal state of said K binary states in a predetermined period of time, and if not, providing an additional time to confirm that said terminal state is either registered or not registered in the at least one of said memory cells.

The selecting operation can be performed as follows:
considering one or more of said "D" memory cells which registered said terminal state as candidates for detecting said signature,
if only one of said candidates is determined, considering said candidate the correct candidate and said signature detected, and
if more than one of said candidates is determined, selecting the correct candidate by at least one action from the following non-exhaustive list comprising: applying a CRC procedure, repeating the method up to receiving the correct candidate.

The method can be repeated, say, by continuing applying the binary signal to the state machine, or by re-assigning the initial state (reset), up to receiving the correct candidate.

The correct candidate is therefore proven by repeating the procedure and confirming the result only when a repetitive (consistent) answer is obtained as many times as wished.

The method of synchronizing the signal comprises the above-described method of detecting the signature, terminated by an operation of determining coordinates of the multiframe with respect to the detected signature, said operation being performed by associating the serial number of the selected memory cell (considered the correct candidate) with timing of specific bits forming said signature in the signal. If the synchronizing operation does not succeed, the whole method can be repeated.

According to one of the preferred embodiments of the invention, said signal is a PDH multiframe signal comprising 24 frames (N=24), having a frame length 193 bit (F=193), and the periodic signature is a so-called Frame Alignment Signal ("S" is FAS), having six successive binary symbols (C=6) spread over the multiframe with the spacing equal to four frames (D=4F=772 bits). As can be seen in this particular example, the bit that carries the FAS signal is the first bit of each fourth frame in the multiframe, therefore the signature is spread with the spacing of four frames both over the signal and over the multiframe.

It should be appreciated, that the same method is applicable for synchronizing other multiframe structures with periodic signatures, say the standard multiframe comprising 12 frames.

In the simplest case, K=C and the terminal state is equal to said check state of the state machine; however, K is usually more than C at least by one additional predetermined state, and preferably K=2.5C.

According to the second aspect of the invention, there is provided a device for detecting a periodic binary signature in a binary signal transmitted at a particular bit rate; said signature forming a pre-selected binary code having a code length of "C" binary symbols spread over the signal with a known spacing "D" of bits between the binary symbols of the code and the adjacent signatures; said device comprising:
a state machine including a logical scheme interconnected with a memory block,
said memory block of the state machine comprising "D" independent memory cells each having its serial number, the memory cells being cyclically connectable to the logical scheme;
each of said memory cells, when in conjunction with the logical scheme, being capable of registering "K" successive binary states of the state machine including an initial state and a terminal state; said "K" states comprising "C" successive binary states respectively associated with "C" binary symbols of the code successively appearing in said signature, (the C-th state being a check state associated with the C-th binary signal of said code and indicating the signature completion);
a control unit responsible for switching said logical scheme to said D memory cells according to their serial numbers and in a cyclical manner at a rate equal to the bit rate of said signal so that, a different memory cell is connected to the logic scheme at each of the time clocks within a group of D time clocks, (thereby at each time clock within the D clocks, a different state machine is formed), said control unit being further capable of continuously checking whether at least one cell of said "D" memory cells has registered the terminal state, and of selecting therefrom a single one considered as detecting said signature;
the arrangement being such that, if one and the same said initial binary state is assigned to all the cells in the memory block, and if said binary signal is applied to the state machine at its bit rate, each bit in any group of D successive bits of the binary signal will be processed using a particular cell of the D memory cells, thereby associating each of the memory cells with a particular bit in any group of D successive bits and allowing said periodic signature formed by a particular bit within said D successive bits to be detected by the respective particular memory cell of said D cells.

The device is preferably adapted for synchronizing said signal using said signature, wherein said signal being a succession of equally sized multiframes, each of said multiframes comprises N binary frames (having a frame length "F" bits) and contains one said periodic binary signature ("S") at a predetermined position in the multiframe Preferably, the control unit is operative in detecting the terminal state whenever registered in one or more of the D memory cells in a predetermined period of time (+an additional time); the control unit being also capable of selecting a single memory cell from those which have detected said signature, by applying a CRC procedure, and adapted to initiate a new session of detecting the signature if said single memory cell has not been found.

According to the most preferred embodiment of the device, said control unit is further provided with synchronizing means capable of determining coordinates of the multiframe with respect to the detected signature, using the serial number of the selected memory cell.

In one particular embodiment, the device is adapted to detect the periodic signature signal in the PDH multiframe signal comprising 24 frames (N=24), having a frame length 193 bit (F=193), wherein the periodic signature is a Frame Alignment Signal ("S" is FAS), having six successive binary symbols (C=6) spread over the multiframe with the spacing equal to four frames (D=4F=772 bits). Theoretically, K may be equal to C so that the terminal state is equal to said check state; however, in practice K is more than C by at least a factor of 2, and preferably K=2.5C.

As one of alternative options, the device can be adapted to detect the periodic signature in a 12-frame PDH multi-frame signal for synchronizing thereof.

The above-described technology enables fast and effective synchronization of multiframe signals owing both to the parallel real time checking of appearance of the expected periodic signature at any bit of the multiframe, and to the economic use of hardware.

BRIEF DESCRIPTION OF THE PREFERRED EMBODIMENTS

The invention will be further described with reference to the following non-limiting drawings, in which.

DETAILED DESCRIPTION OF THE PREFERRED EMBODIMENTS

Figure 1:
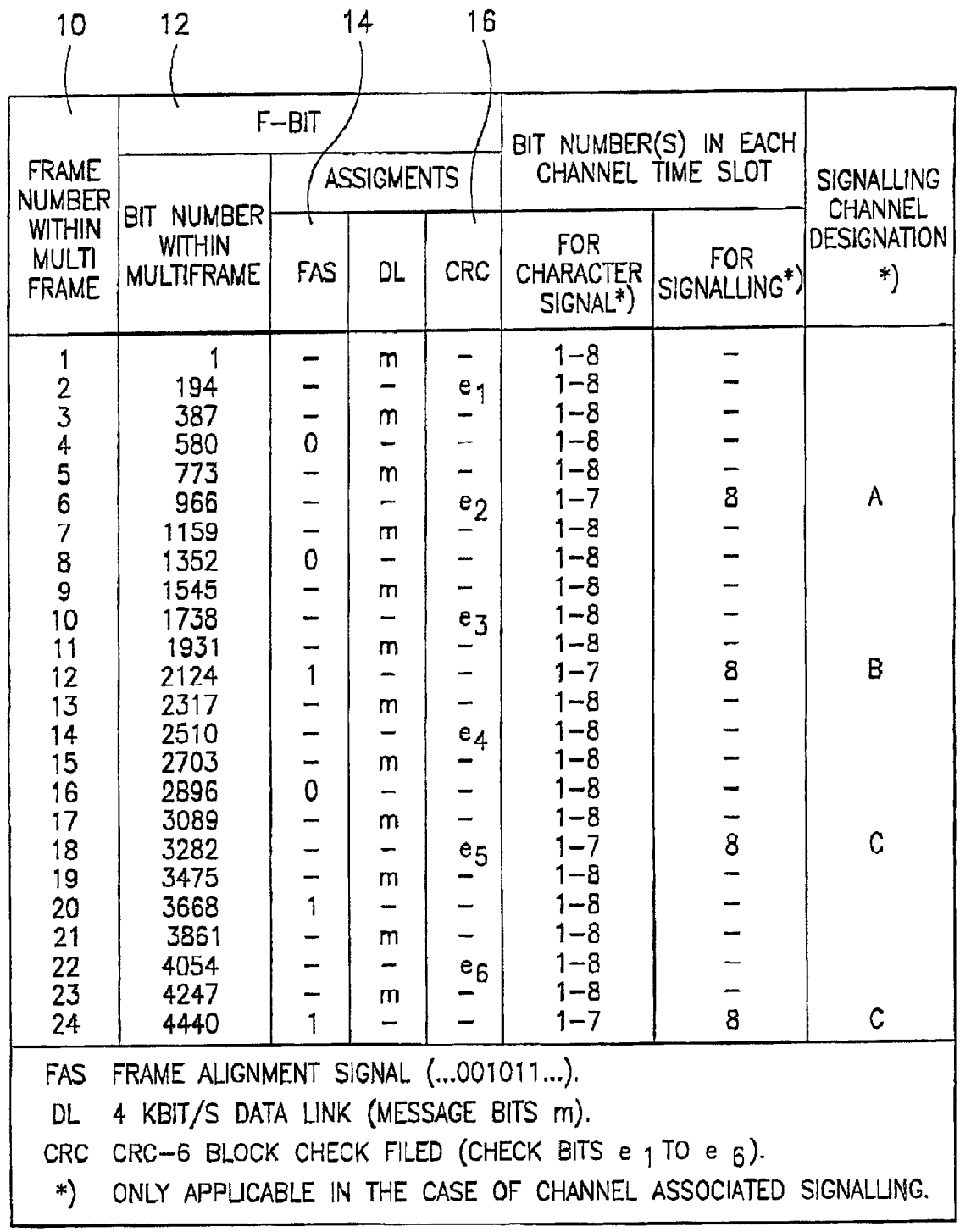
FIG. 1 is a table which schematically illustrates, using one example of a standardized multiframe structure, how a periodic signature may be positioned in the multiframe.

FIG. 1 presents a Table 1/G.704 taken from the Standard Recommendation G.704, to illustrate a multiframe structure for the 24-frame multiframe, which is one of the most typical examples of multiframe structures. Using the terms and symbols accepted in the present application, number of frames N=24, and F (the frame length)=193 in this example. The table shown in FIG. 1 comprises two main columns 10 and 12. Column 10 indicates a frame number within the multiframe, and column 12—various functions of bit F, which is a first bit in any frame forming the multiframe. As can be noticed, column 14 illustrates how binary symbols appearing in the F-bit of each fourth frame in the multiframe form a periodic signature called FAS (Frame Alignment Signal). In this particular example, the binary code of the FAS is 001011 (to be read from the beginning till the end of the multiframe). The length C of the code is equal to 6, and the spacing at which binary symbols of the signature are spread over the multiframe (as well as over the signal comprising a succession of the similar multiframes) is equal to four frames i.e., D=772 bits.

F-bits of frames number 2, 6, 10, 14, 18 and 22 comprises check-bits of the CRC-6 block check field (see column marked 16). CRC-6 is a specific Cyclic Redundancy Check method for performance monitoring.

Figure 2:
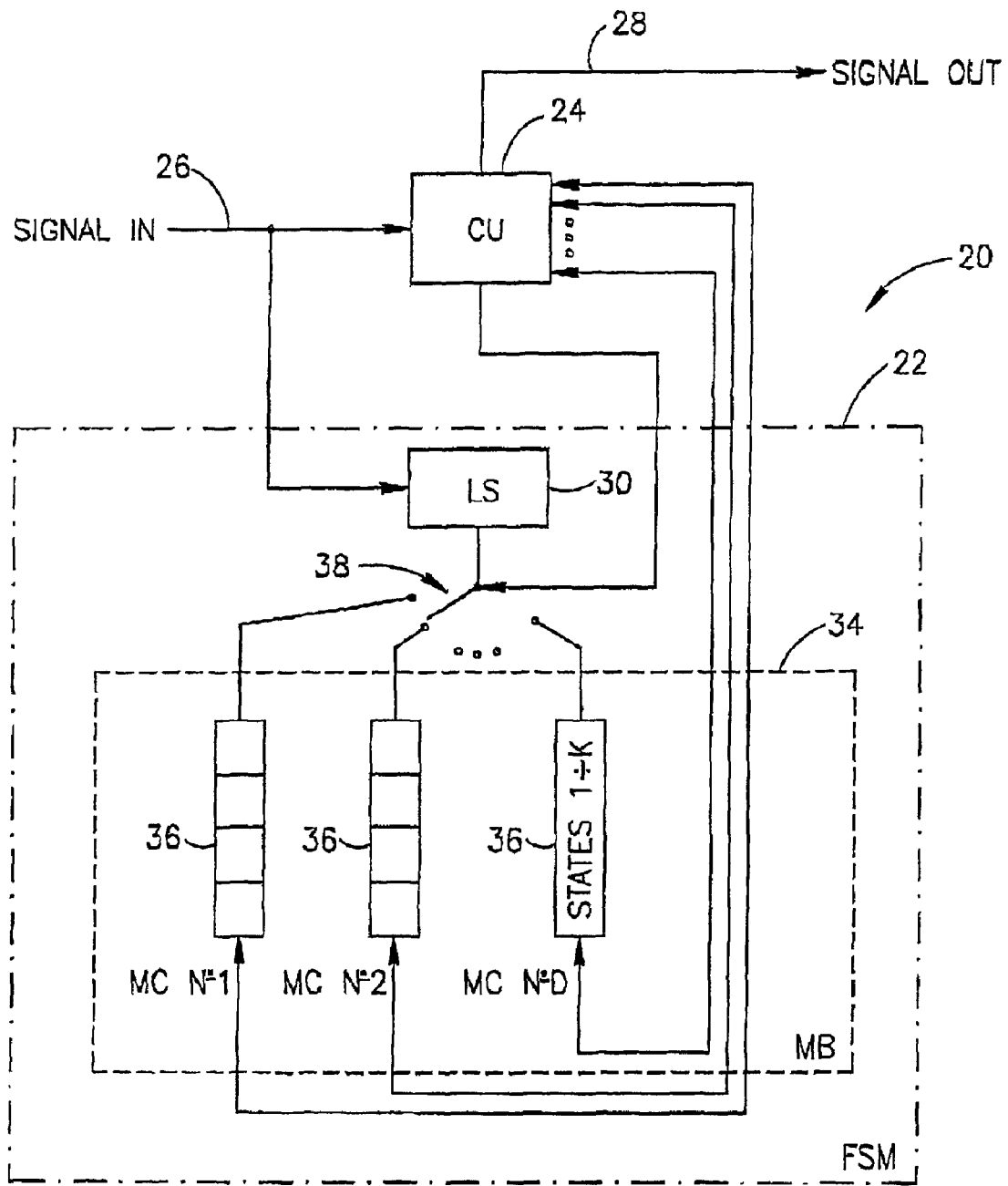
FIG. 2 is a schematic block-diagram of one embodiment of the device according to the invention.

FIG. 2 schematically illustrates a block-scheme of a device 20 according to the invention, comprising a final state machine 22 for detecting periodic signatures in multiframes. In the figure, the device 20 generally comprises the FSM 22 interacting with and controlled by a control unit marked 24. An incoming binary signal comprising a succession of equally formatted multiframes is entered into the device over an input contact 26. An outgoing synchronized signal is schematically shown on the output contact 28. (The control unit CU 24 is supposed to contain synchronizing means for synchronizing the binary signal with respect to the periodic signature, upon the signature is detected and checked by the control unit). The FSM 22, as any FSM comprises a logic scheme LS marked 30 interacting with a memory block 34. The FSM is adapted to recognize a particular expected signature by reaching a predetermined terminal state (which is registered in the memory block of FSM) when the signature is received by the state machine at least once and in its correct order. According to the invention, the memory block of the FSM is divided into a plurality of memory cells 36 (each being additionally marked by their serial numbers: No.1, No.2 . . . No."D", wherein "D" is the spacing between two adjacent binary symbols in the signature under check). With a rate, equal and synchronous to the bit rate of the incoming signal, the FSM 22 is continuously reconfigured by the control unit 24, and this principle is shown in the figure by means of a schematic "multi-position switch" 28 controlled by CU 24.

The device works as follows. For each bit incoming the FSM via its logical scheme 30, the memory block 34 is represented by one of its cells 36; it should be emphasized that the cells are "connected and disconnected" in a cyclical order with a periodicity equal to "D". Remembering that one of the binary symbols of an expected periodic signature (say, of the signature 001011) should definitely fall into the spacing D (say, four frames or 772 bits), it is assumed that one of the cells will catch the signature during a number of cycles. Indeed, in any group of D successive bits of the binary signal, each of the bits is processed using a particular cell of the D memory cells due to switching from one memory cell to another in a predetermined cyclical order. Owing to that, each bit of the signal (say, within a quartet of frames) will be associated with a particular memory cell 36, and will be analyzed by the FSM with respect to its corresponding memory cell.

Each of the memory cells 36 comprises a number of bits (implemented by flip-flops) which are intended for coding the present state of the FSM, beginning from an initial state (say, 0000), via a number of current states which are reached after receiving the entering bits of the signal, and up to a terminal state (say, 1111) which can be reached when the expected signature is received a pre-selected number of times.

In the simplest case, for the 24-frame structure having the 6-positioned FAS code (C=6), the minimal number of the FSM states is six, i.e. the state machine must sequentially pass six states when receiving the correct sequence of six bits 001011. The states can be indicated as their coded numbers: 0 (initial), 1, 2, 3, 4, 5 and 6; the coded number of a particular state is created in a particular cell each time when the expected bit enters the cell in the expected sequence. If bits enter a particular cell in the order 001011, the cell will acquire state "6" after entering the sixth bit. For checking the result once again, the machine may be considered to have 12 states; for checking it for yet additional 0.5 times it may have 15 states (K=15, coded as 1111). If every cell 36 is built on four flip-flops, 15 states can be coded by using all the flip-flops in the cell, so the initial state will be coded as 0000, and the terminal state as 1111.

Figure 3:
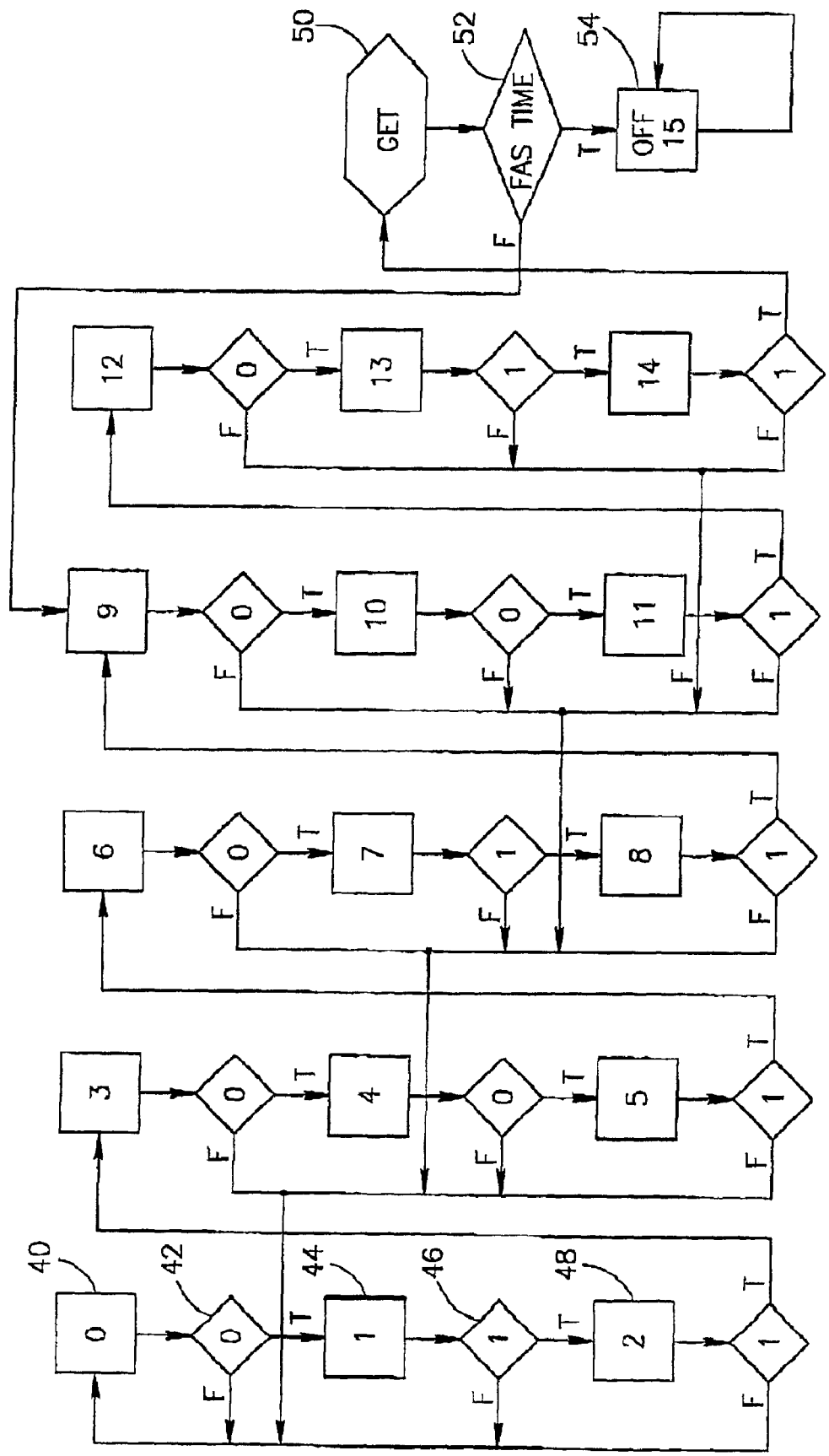
FIG. 3 is a simplified flow-chart of one embodiment of the state machine for detecting a periodic signature according to the invention.

FIG. 3. Continuing the example discussed above, where the incoming signal is a 24-frame multiframe, the periodic signature is FAS, and the spacing (D) is equal to a quartet of frames or 772 bits, let's now describe a flow-chart of the state machine with respect to one of its memory cells (actually, a flow chart of one of the sub-state machines of the FSM).

Let the initial state "0" (coded as 0000) is set at all the 772 cells. The physical meaning is that any one of bits in consequently received 4 frames may appear to be the F-bit which forms the beginning of the expected code FAS. With respect to one particular (exemplary) cell, the initial state "0" is indicated by operator 40.

Suppose, the first bit of data which has entered the device arrives to our exemplary cell. Let's suppose that the logical scheme of the FSM is designed so that it starts reacting to the signature from its middle portion (just 011001011001 . . . ; such an arrangement will inevitably catch the expected periodic signature 001011). Let the first bit which has arrived is 0. The FSM checks whether the bit suits to the expected beginning of the signature (block 42). Since "0" was expected, the exemplary cell will be set to its next state "1" (block 44). Would the first bit be "1", it would not cause the cell to change its initial state, and the exmplary cell would therefore be awaiting the "designed" beginning of the FSA code.

It is kept in mind that the second data bit of the signal will arrive to the next memory cell of the memory block and thus will not affect the exemplary cell.

At the end of the fourth frame (speaking strict—at the end of the first group of 772 bits, since we are not sure whether we started from the beginning of the multiframe), all 772 bits of the frame quartette will be checked, thus registering in some of the memory cells state "1" (0001) which signifies "the correct beginning" of the FAS code. It is understood, that one of these cells might catch the beginning of the real FAS code.

Bit No. 773 belonging to the second frame quartette of the signal will be brought to the exemplary cell again, and, if it occurs to be "1", will turn the cell (or the sub-FSM related to this cell) to state "2" (blocks 46 and 48). If this bit is "0", the exemplary cell will be reset to the initial state, i.e., will re-start catching the beginning of the signature.

The following four frames (i.e., the second group of 772 bits), and so on (up to and including "the 6-th quartette of frames" of the "24-frame structure" from the beginning of the test) will be checked by the cyclical use of the same memory block. In other words, the first bit of the second frames quartette will be checked by the first cell of the memory, and so on. During the check of the second quartette of frames, some memory cells from those which caught the correct beginning of the FAS code will acquire the next correct state "2" (0010).

Continuation of the flow-chart shown in FIG. 3 illustrates how the signature can be detected by the "exemplary" memory cell of the FSM after checking two and a half multiframes. As agreed, the terminal state of the FSM is 15 (1111). If the terminal state 15 is about to be reached and is going to be registered in the exemplary cell (block 50), an additional time check is applied (FAS time, block 52) to ensure that the signature has been detected within a check-period of time set in advance. When this condition is fulfilled, the exemplary cell registers and preserves the terminal state 15 (block 54). The succession of binary symbols which brought to the terminal state is as follows (see the symbols in the rhomboid logical operators): 011001011001011. The expected periodic signature FAS (001011) of the 24-frame multiframe is contained twice in this succession, so it is both detected and confirmed.

It should be noted, that if still a longer re-check is required, the state machine can be reset partially or completely during its operation. For example, if the machine having 15 states is completely reset after reaching its 15-th state, and then continues checking, one may obtain a 3-fold check.

Figure 4:
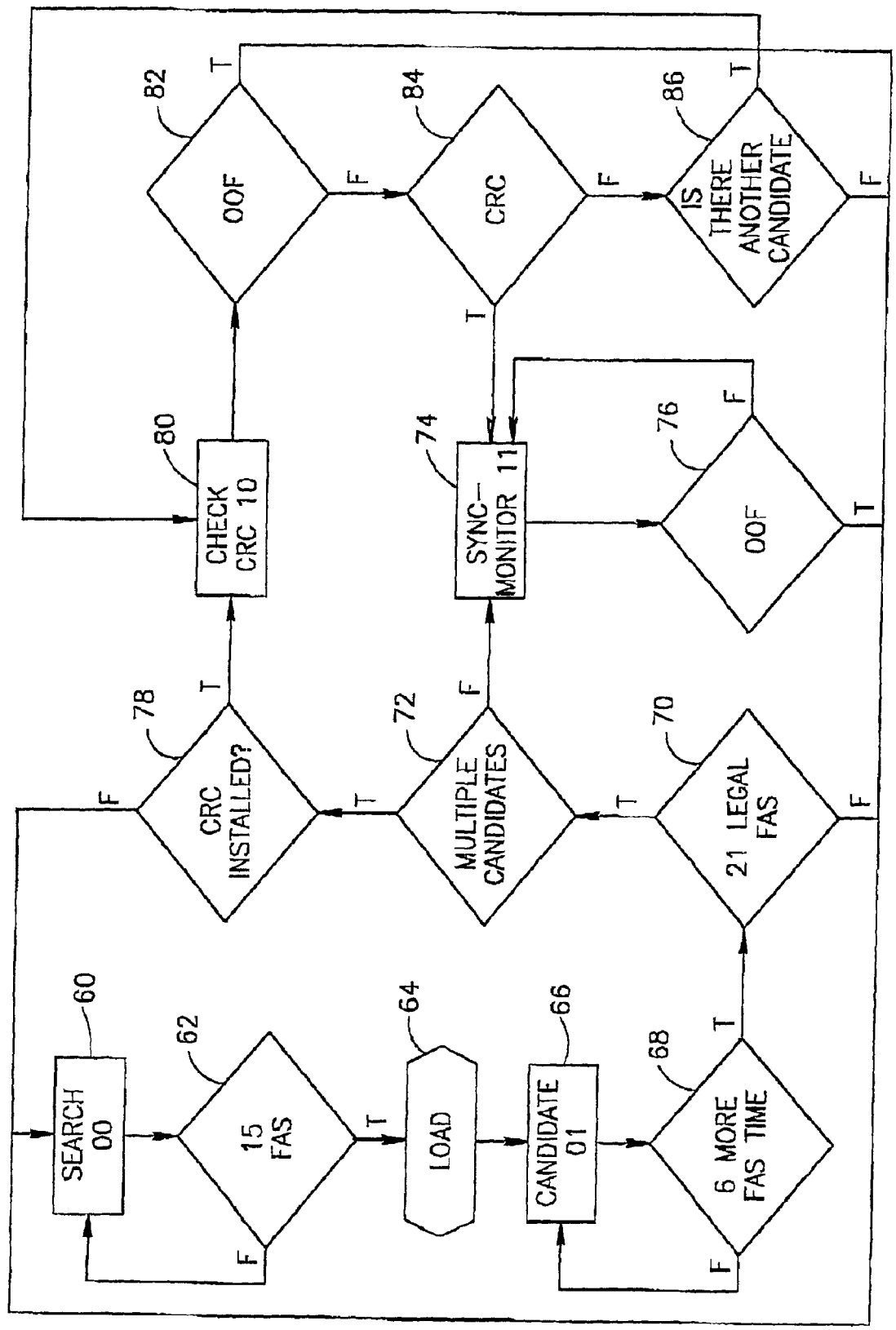
FIG. 4 is a simplified flow-chart illustrating how synchronization can be performed based on detecting the periodic signature according to the invention.

FIG. 4 illustrates a flow chart explaining selection of the only true signature indication for the multiframe synchronization.

When one or more of the memory cells arrive to a pre-determined terminal state (be it 6, 15, or more) within the check time which is stated in advance, it will mean that one or more of the FAS candidates are found. However, only one of them can be true, while all the others are erroneous (which may be caused by unstable transmission or the like). In order to select the real one from such multiple candidates, a CRC procedure can be used (if the CRC means are provided in the multiframe structure, see FIG. 1 column 16). If in the affirmative, the CRC procedure is activated and assists in selecting the only correct candidate of the FAS bit in the multiframe; based on that, the multiframe can finally be synchronized.

In the drawing, blocks 60, 62 reflect searching for at least one memory cell with the FAS state 15 registration, and loading data on all of them (according to a particular serial order) as candidates for the true FAS (block 64). One of the candidates is further picked out for monitoring (block 66) and the result is subjected to an additional check for, say, 6 states. If the candidate arrives to the expected result within the predetermined FAS time (block 68) and it corresponds to 21 states of the FSM ("21 legal FAS", block 70), it is worth to check whether there are still multiple candidates (block 72). If the candidate does not reach the state 21 it is either replaced with another one, or the search is repeated. If the candidate stands the "6 more" re-check and there are no other candidates, the received result is used for synchronizing the signal by means of the Synchronizing Monitor (block 74). If the synchronizing is unsuccessful (Out Of Frame alarm is received—block 76), the search starts from the beginning. However, if the candidate has reached the state 21, but there are still other candidates, the situation can be resolved either by restarting the search, or by using the CRC procedure if incorporated in the application (block 78). After the CRC procedure is performed (block 80), there is a check for "out of frame" (block 82), and if it is negative, there is a check for CRC result (block 84). The expected result of CRC check brings the candidate to the synchronizing block 74. If the CRC check is unsuccessful for this candidate, it is performed for another candidate if one exists (block 86). If there is no a spare candidate, the search will be started from the very beginning.

A similar algorithm & device can be used for the 12-frame multiframe structure in PDH, but with a different binary code of the signature and with a different spacing D between the groups of frames to be checked.

Analogously, the proposed method can be applied to any binary signal being a succession of frames and carrying a periodic signature, for detecting the signature and synchronizing the signal.

What is claimed is:

1. A method for detecting a periodic binary signature in a binary signal, the method including steps of:
    providing the binary signal being a succession of binary symbols transmitted at a predetermined bit rate;
    providing the periodic binary signature being in the form of a pre-selected binary code having a code length of "C" binary symbols spread over the signal with a spacing of "D" bits both between the binary symbols of the signature, and between each two adjacent signatures;
    providing a state machine comprising a logical scheme interconnected with a memory block, providing the memory block of said state machine to comprise "D" independent memory cells each having its serial number, for cyclically connecting thereof to the logical scheme;

ensuring that each of the memory cells, when in conjunction with the logical scheme, is capable of registering "K" successive binary states of the state machine including an initial state and a terminal state and comprising "C" successive binary states respectively associated with "C" binary symbols of the signature appearing in their predetermined order in said signature;

assigning one and the same of an initial binary state to all the cells in the memory block;

applying said binary signal, at the predetermined bit rate, to the state machine, synchronously with said bit rate, switching the logical scheme of the state machine to D memory cells in a cyclical order for processing each bit within any group of D successive bits of the binary signal by a particular cell of the D memory cells; thereby associating each particular memory cell in the memory block with a respective bit in any group of D successive bits of the signal;

continuously checking whether one or more of said "D" memory cells have registered the terminal state, and if in the affirmative, selecting a single memory cell considered as detecting said signature, wherein:

"C"—is an integer which is a number of binary positions of the periodic binary signature, "D"—is an integer, said integer being a) a number of binary positions of the binary signal forming the space between adjacent binary symbols of the periodic binary signature, and b) a number of independent memory cells, "K"—is an integer which is a number of successive binary states of the state machine, "K" being no less than "C".

2. The method according to claim 1, for synchronizing the binary signal using the periodic binary signature, wherein said signal is a succession of equally sized multiframes, each of said multiframes comprises N binary frames having the frame length "F" bits, and wherein the periodic binary signature has a predetermined position in the multiframe.

3. The method according to claim 1, wherein the checking operation is performed by continuously monitoring whether at least one cell of said "D" memory cells has registered the terminal state of K binary states in a predetermined period of time, and if not, providing an additional time for applying the binary signal to the state machine to confirm that said terminal state is either registered or not registered in one or more of said memory cells.

4. The method according to claim 1, wherein the selecting operation is performed as follows:

considering one or more of said "D" memory cells which registered said terminal state as candidates for detecting said signature, if only one of said candidates is determined, considering said candidate the correct candidate and said signature detected, and if more than one of said candidates is determined, selecting the correct candidate by at least one action from the following non-exhaustive list comprising: applying a CRC procedure, continuing the operation of applying the binary signal to the state machine, repeating the method from the operation of assigning the initial state, up to receiving the correct candidate.

5. The method according to claim 2, terminated by an operation of determining coordinates of the multiframe with respect to the detected signature, an operation of determining coordinates being performed by associating the selected memory cell with timing of specific bits forming said signature in the signal.

6. The method according to claim 2, wherein said signal is a PDH multiframe signal comprising 24 frames (N=24), having a frame length 193 bit (F=193), and the periodic signature is a so-called Frame Alignment Signal (FAS), having six successive binary symbols (C=6) spread over the multiframe with the spacing equal to four frames (D=4F=772 bits).

7. The method according to claim 6, wherein K=2.5C.

8. A device for detecting a periodic binary signature in a binary signal transmitted at a particular bit rate, said signature forming a pre-selected binary code having a code length of "C" binary symbols spread over the signal with a known spacing "D" of bits between the binary symbols of the signature as well as between adjacent signatures;

said device comprising:

a state machine including a logical scheme interconnected with a memory block, said memory block of the state machine comprising "D" independent memory cells each having its serial number, the memory cells being cyclically connectable to the logical scheme;

each of said memory cells, when in conjunction with the logical scheme, being capable of registering "K" successive binary states of the state machine including an initial state and a terminal state; "K" states comprising "C" successive binary states respectively associated with "C" binary symbols of the code successively appearing in said signature;

a control unit responsible for switching said logical scheme to D memory cells according to their serial numbers and in a cyclical manner at a rate equal to the bit rate of said signal so that, a different memory cell is connected to the logic scheme at each of the time clocks within a group of D time clocks, said control unit being further capable of continuously checking whether at least one cell of said "D" memory cells has registered the terminal state, and of selecting therefrom a single one considered as detecting said signature;

the arrangement being such that, if one and the same said initial binary state is assigned to all the cells in the memory block, and if said binary signal is applied to the state machine at its bit rate, each bit in any group of D successive bits of the binary signal will be processed using a particular cell of the D memory cells, thereby associating each of the memory cells with a particular bit in any group of D successive bits and allowing a periodic signature formed by a particular bit within said D successive bits to be detected by the respective particular memory cell of D cells, wherein:

"C"—is an integer which is a number of binary positions of the periodic binary signature, "D"—is an integer, said integer being a) a number of binary positions of the binary signal forming the spacing between adjacent binary symbols of the periodic binary signature, and b) a number of independent memory cells, "K"—is an integer which is a number of successive binary states of the state machine, "K" being no less than "C".

9. The device according to claim 8, adapted for synchronizing the signal, wherein said signal is a succession of equally sized multiframes, each of said multiframes comprises N binary frames of a frame length "F" bits, each of the frames containing one said periodic binary signature at a predetermined position in the multiframe.

10. The device according to claim 8, wherein the control unit is operative in detecting the terminal state whenever registered in one or more of the D memory cells in a predetermined period of time; the control unit being also capable of selecting a single memory cell from those which have detected said signature, by applying a CRC procedure, and adapted to initiate a new session of detecting the signature if said single memory cell has not been found.

11. The device according to claim 8, wherein said control unit is further provided with synchronizing means capable of determining coordinates of the multiframe with respect to the detected signature, using identification of the selected memory cell.

12. The device according to claim 9, specifically adapted to detect the periodic signature signal in the PDH multiframe binary signal comprising 24 frames (CN=24), having a frame length 193 bit (F=193), wherein the periodic signature is a Frame Alignment Signal (FAS), having six successive binary symbols (C=6) spread over the multiframe with the spacing equal to four frames (D=4F=772 bits).

* * * * *